(12) United States Patent
Zhou et al.

(10) Patent No.: US 12,182,255 B2
(45) Date of Patent: Dec. 31, 2024

(54) SYSTEMS AND METHODS FOR AUTOMATED RULE-BASED DETECTION

(71) Applicant: Walmart Apollo, LLC, Bentonville, AR (US)

(72) Inventors: Siyuan Zhou, Fremont, CA (US); Jing Xia, Dublin, CA (US); Alexander Chobanyan, Milpitas, CA (US); Bradley Lamarr Leonard, Los Gatos, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 340 days.

(21) Appl. No.: 17/589,773

(22) Filed: Jan. 31, 2022

(65) Prior Publication Data
US 2023/0244783 A1     Aug. 3, 2023

(51) Int. Cl.
*G06F 21/55*     (2013.01)
(52) U.S. Cl.
CPC ........ *G06F 21/55* (2013.01); *G06F 2221/034* (2013.01)
(58) Field of Classification Search
CPC ............................ G06F 21/55; G06F 2221/034
See application file for complete search history.

(56) References Cited

U.S. PATENT DOCUMENTS

| | | | |
|---|---|---|---|
| 2017/0244737 A1* | 8/2017 | Kuperman | G06N 3/084 |
| 2020/0218968 A1* | 7/2020 | Gliozzo | G06F 21/554 |
| 2020/0242417 A1* | 7/2020 | Sagi | G06F 18/2433 |
| 2020/0334228 A1* | 10/2020 | Matyska | G06Q 30/0185 |
| 2020/0334679 A1* | 10/2020 | Sandepudi | G06Q 20/4016 |
| 2020/0387835 A1* | 12/2020 | Sandepudi | G06N 5/025 |
| 2021/0042824 A1* | 2/2021 | Tarler | G06F 18/2413 |

* cited by examiner

*Primary Examiner* — Khoi V Le
(74) *Attorney, Agent, or Firm* — Morgan, Lewis & Bockius LLP; Manita Rawat (57) ABSTRACT

Systems and methods for generating, selecting, and implementing rule-based strategies are disclosed. An input data set representing a plurality of interactions that may be classified as malicious or non-malicious is received and at least one strategy tree including a plurality of rule-based strategies is generated. The at least one strategy trees is generated by a machine learning model configured to generate a tree structure. The rule-based strategies are ranked based on a precision-recall-stability (PRS) score generated for each of the rule-based strategies and at least a first rule-based strategy having a highest PRS score is extracted. One or more interactions are evaluated using the first rule-based strategy to determine when the one or more interactions are malicious.

15 Claims, 7 Drawing Sheets

SYSTEMS AND METHODS FOR AUTOMATED RULE-BASED DETECTION

TECHNICAL FIELD

This application relates generally to rule-based detection processes and, more particularly, to automated strategy-tree selection for rule-based detection processes.

BACKGROUND

Current computer systems utilize rules-based strategies for identifying bad actors and/or actions. Current rule-based strategies require identification and understanding of attacks, exploits, or other actions used by bad actors and creation of new strategies to combat emerging or changing vectors of attack. Identification of emerging vectors requires a detailed understanding of the system, how attackers operate, and significant investments of time and resources.

In addition to requiring heavy resource investment, current rule-based strategies, as generated by human operators, are often inefficient and/or untargeted. A human operator identifying a new exploit or attack may not be able to identify the exact mechanism by which the attack is being conducted, and thus may identify a less-than-optimal solution for detecting or defeating the attack.

SUMMARY

In various embodiments, a system is disclosed. The system includes a non-transitory memory having instructions stored thereon and a processor configured to read the instructions. The processor is configured to receive an input data set representing a plurality of interactions that may be classified as malicious or non-malicious, generate at least one strategy tree including a plurality of rule-based strategies, rank the rule-based strategies based on a precision-recall-stability (PRS) score generated for each of the rule-based strategies, extract at least a first rule-based strategy having a highest PRS score, and evaluate one or more interactions using the first rule-based strategy to determine when the one or more interactions are malicious. The at least one strategy trees is generated by a machine learning model configured to generate a tree structure.

In various embodiments, a non-transitory computer readable medium having instructions stored thereon is disclosed. The instructions, when executed by a processor cause a device to perform operations including receiving an input data set representing a plurality of interactions that may be classified as malicious or non-malicious, generating at least one strategy tree including a plurality of rule-based strategies, ranking the rule-based strategies based on a precision-recall-stability (PRS) score generated for each of the rule-based strategies, extracting at least a first rule-based strategy having a highest PRS score, and evaluating one or more interactions using the first rule-based strategy to determine when the one or more interactions are malicious. The at least one strategy trees is generated by a machine learning model configured to generate a tree structure.

In various embodiments, a computer-implemented method is disclosed. The computer-implemented method includes the steps of receiving an input data set representing a plurality of interactions that may be classified as malicious or non-malicious, generating at least one strategy tree including a plurality of rule-based strategies, ranking the rule-based strategies based on a precision-recall-stability (PRS) score generated for each of the rule-based strategies, extracting at least a first rule-based strategy having a highest PRS score, and evaluating one or more interactions using the first rule-based strategy to determine when the one or more interactions are malicious. The at least one strategy trees is generated by a machine learning model configured to generate a tree structure.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In various embodiments, systems and methods for generating and deploying rule-based strategies are disclosed. The systems and methods include development and analysis of multiple strategy trees implementing rule-based detection and/or mitigation processes for identifying and preventing attack vectors for a predetermined environment. In some embodiments, multiple strategy trees are generated and evaluated using on precision-recall-stability (PRS) score and/or a PRS-area-under-the-curve (AUC) (PRS-AUC) score. A set of N strategy trees having the highest PRS-AUC score may be selected for execution and deployment in a production environment. In some embodiments, a PRS score may be used to select a set of M paths within the N strategy trees for execution and deployment as a rule set in a production environment.

Figure 1:
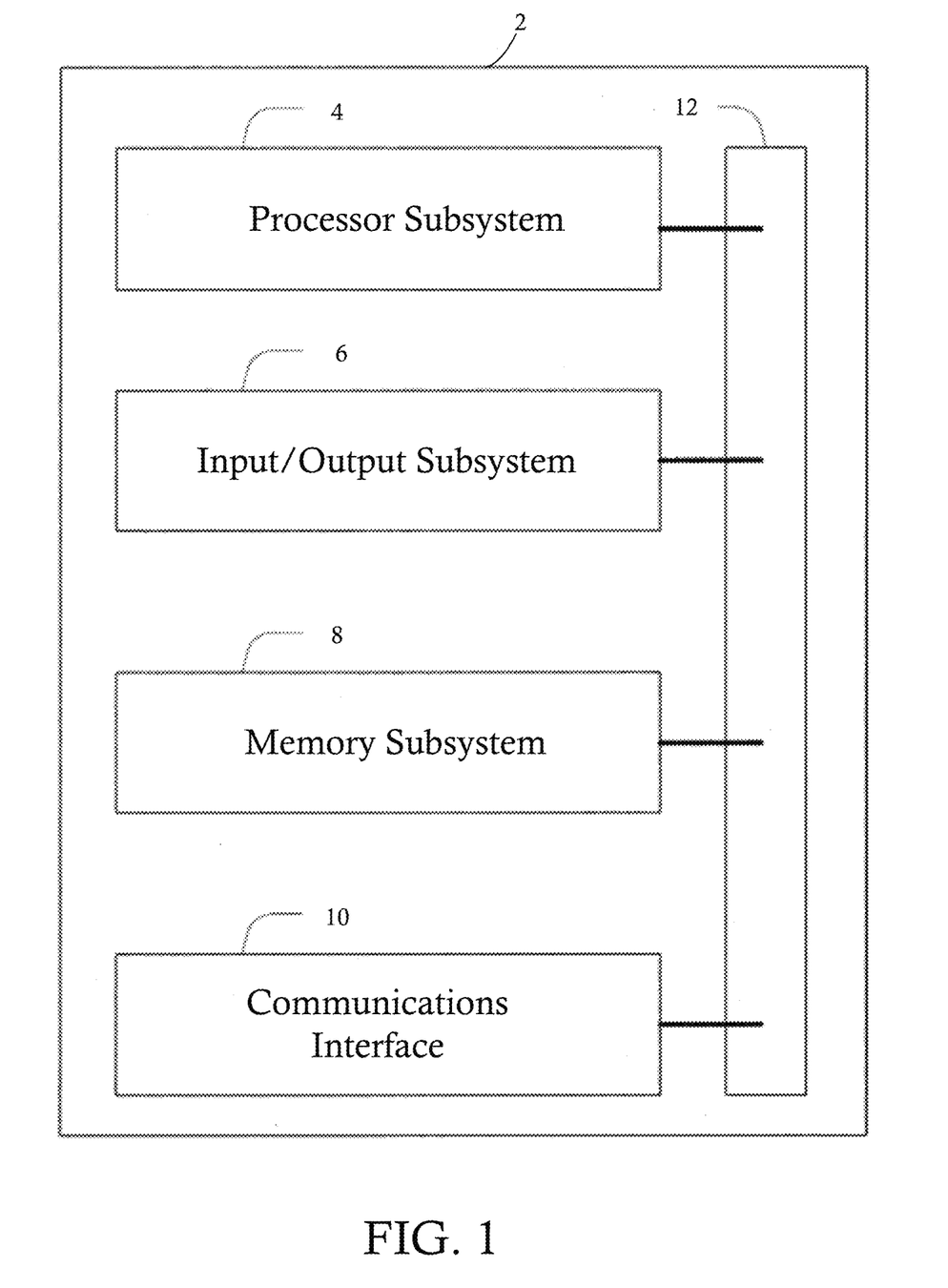
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, Fire Wire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods for generating and deploying rule-based strategies, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
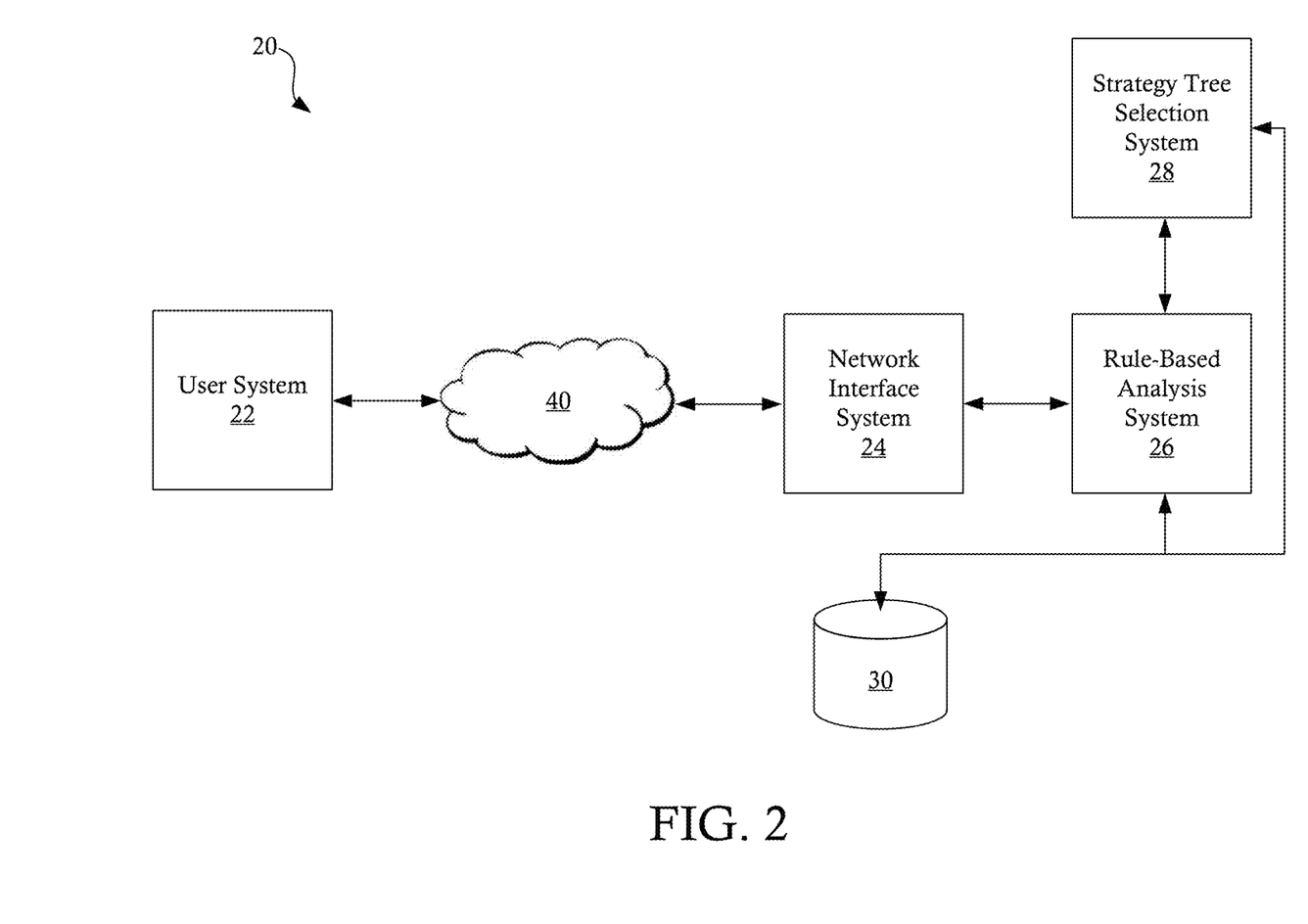
FIG. 2 illustrates a network environment configured to provide automatic strategy tree selection for rule-based strategy development and deployment, in accordance with some embodiments.

FIG. 2 illustrates a network environment 20 configured to provide automated generation and deployment of rule-based strategies, in accordance with some embodiments. The network environment 20 may include, but is not limited to, a user system 22, a network interface system 24, a rule-based analysis system 26, a strategy selection system 28, a database 30, and/or any other suitable system. Each of the systems 22-28 and/or the database 30 may include a system as described above with respect to FIG. 1. Although embodiments are illustrates herein having discrete systems, it will be appreciated that one or more of the illustrated systems may be combined into a single system configured to implement the functionality and/or services of each of the combined systems. For example, although embodiments are illustrated and discussed herein including each of a network interface system 24, a rule-based analysis system 26, and a strategy selection system 28, it will be appreciated that these systems may be combined into a single logical and/or physical system configured to perform the functions and/or provide services associated with each of the individual systems. It will also be appreciated that each of the illustrated systems may be replicated and/or split into multiple systems configured to perform similar functions and/or parts of a function. Although embodiments are discussed herein including a network environment, it will be appreciated that the systems and methods discussed herein may be implemented within a single system.

In some embodiments, the network interface system 24 is configured to provide a network interface to the user system 22. The network interface may include any suitable type of network interface, such as, for example, an e-commerce interface, a search interface, an inventory interface, etc. Although embodiments are discussed herein with reference to an e-commerce network interface, it will be appreciated that the disclosed systems and methods are applicable to any interface including sets of items that may be retrieved based on search queries and rankings.

In some embodiments, the network interface 24 is configured to provide an interface to facilitate an interaction between the user system and one or more networked systems. For example, in an e-commerce environment, the network system 24 may be configured to provide an e-commerce interface configured to facilitate one or more interactions such as a purchase interaction, a return interaction, etc. The network system 24 may utilize one or more rules for evaluating and approving interactions with the user system. For example, in an e-commerce environment, the network system 24 may be configured to utilize one or more fraud detection rules to prevent fraudulent transactions. Although embodiments are discussed herein including an e-commerce environment, it will be appreciated that the disclosed systems and methods may be applied to any system configured to provide interactions that may be potentially exploited and/or otherwise attacked.

In some embodiments, the network interface system 24 is in signal (e.g., data) communication with a rule-based analysis system 26. The rule-based analysis system 26 is configured to implement one or more rule-based strategies for detecting malicious interactions (e.g., attacks, fraud, hacking attempts, etc.). The rule-based analysis system 26 is configured to apply one or more sets of rules to interactions with the user system 22 to identify malicious interactions and prevent the malicious activity from occurring. In various embodiments, malicious interactions may include attempts to perform fraudulent transactions with respect to the network interface system 24. For example, in some embodiments, fraudulent transactions may include, but are not limited to, fraudulent purchases or fraudulent returns.

In some embodiments, the rule-based analysis system 26 is in signal (e.g., data) communication with a database 30 configured to store one or more rule sets for implementation by the rule-based analysis system 26. The rule sets may be stored in any suitable format for retrieval and implementation. In some embodiments, the rule sets are stored in a real-time decision engine language. In some embodiments, the rule sets are stored in a first format and converted to a second format prior to implementation by the rule-based analysis system 26.

In some embodiments, the rule-based analysis system 26 is in signal (e.g., data) communication with a strategy selection system 28. The strategy selection system 28 is configured to implement a method of generating and selecting one or more rule-based strategies for detection of malicious interactions or activities. The strategy selection system 28 may be configured to implement a method of generating rule-based strategies based on one or more calculated scores, such as a precision-recall-stability (PRS) score and/or a PRS area under the curve (AUC) (PRS-AUC) score, as discussed below. For example, in some embodiments, the strategy selection system 28 is configured to generate a plurality of strategy trees identifying rule implementations and rank each of the strategy trees according to a PRS-AUC score. In some embodiments, specific paths within a selected tree may be ranked based on a PRS score to identify one or more optimal rule sets within a tree.

In some embodiments, the strategy selection system is in signal communication with one or more databases, such as database 30. The database may be configured to receive rule sets identified by the strategy selection system 28. The database stores the rule sets for deployment by the rule-based analysis system 26. In some embodiments, the database is configured to store training data for training multiple strategy trees for analysis by the strategy selection system, as discussed in greater detail below. The stored data may include any suitable training data set configured to train any selected algorithm, such as a decision tree algorithm, as discussed below.

Figure 3:
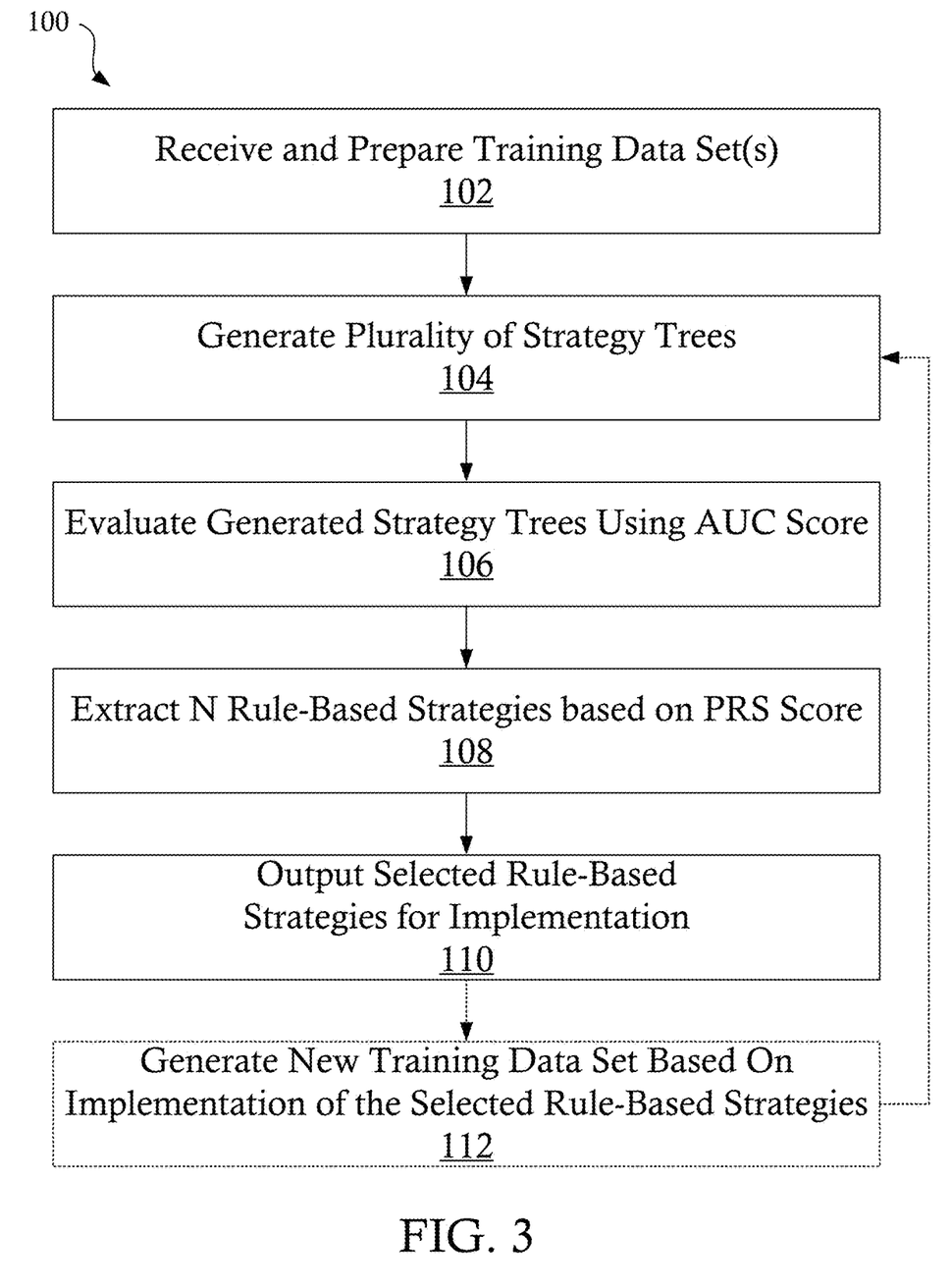
FIG. 3 is a flowchart illustrating a method of generating rule-based strategies, in accordance with some embodiments.
Figure 4:
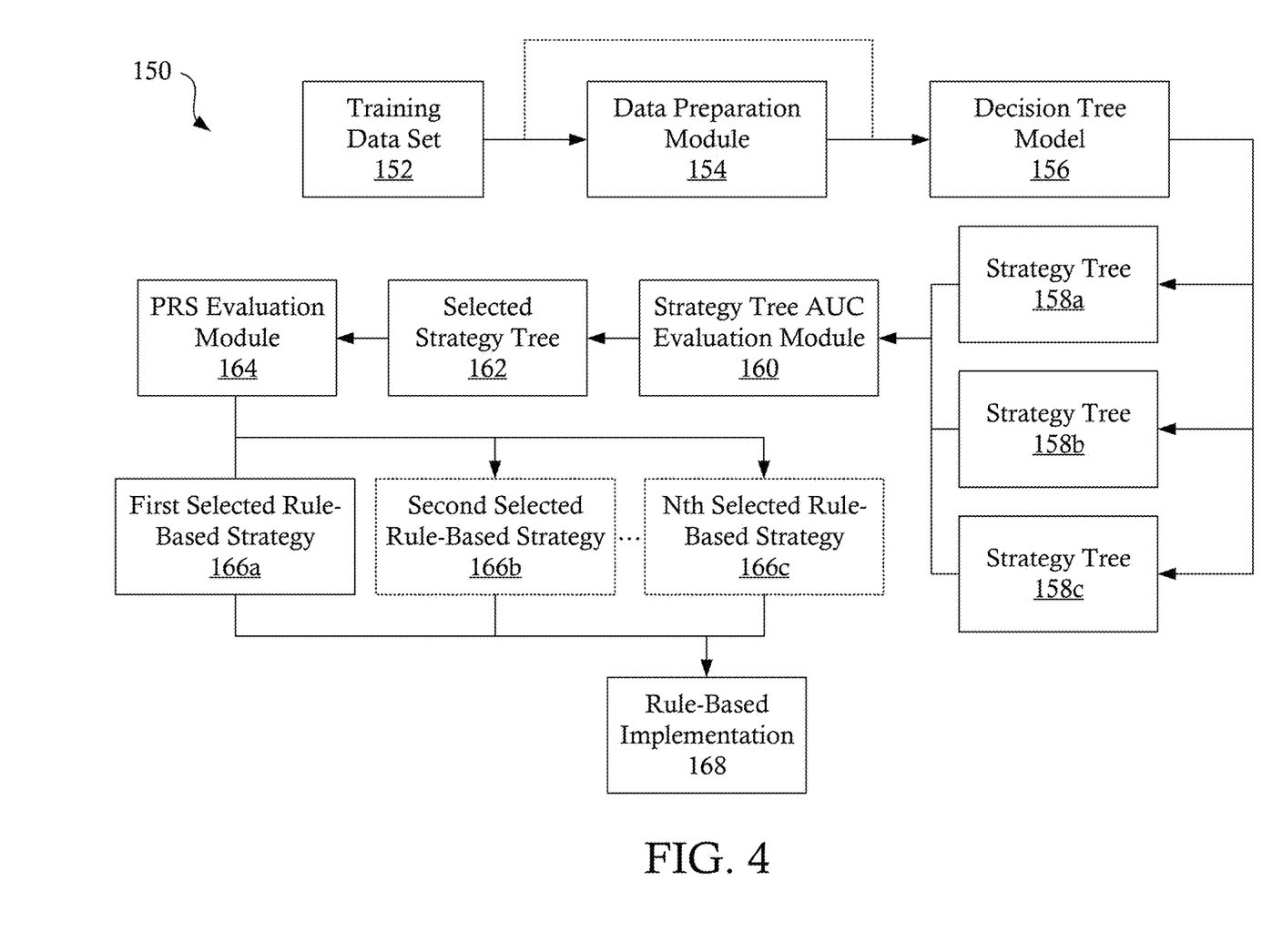
FIG. 4 is a process flow illustrating various steps of the method of generating rule-based strategies illustrated in FIG. 3, in accordance with some embodiments.

FIG. 3 is a flowchart illustrating a method 100 of generating rule-based strategies, in accordance with some embodiments. FIG. 4 is a process flow 150 illustrating various steps of the method 100 of generating rule-based strategies illustrated in FIG. 3, in accordance with some embodiments. At step 102, one or more sets of training data 152 are received and prepared for use in training one or more strategy tree models, as discussed in greater detail below. The data preparation step may include any suitable preparation, such as filtering, selection of one or more testing/validation sets, normalization, and/or any other suitable preparation step. In some embodiments, the training data 152 is received in a suitable format for training one or more models, and the preparation portion of step 102 may be omitted. The data may be prepared by a data preparation process 154 implemented by one or more systems, such as, for example, the strategy selection system 28.

In some embodiments, the input data 152 is related to a malicious interaction with one or more systems. For example, in some embodiments, the input data 152 represents information related to a set of interactions that may qualified as malicious and/or normal. The input data 152 may include a categorization and/or other indication of each set of data within the input data 152 indicating whether the associated interaction was malicious. The interactions may include approved interactions (e.g., interactions in which the system is used as intended, such as legitimate transactions) and/or unapproved interactions (e.g., interactions in which the system is not used as intended for malicious purposes such as bad actions, attack or exploits, partial attacks or exploits, fraudulent transactions, etc.).

At step 104, a plurality of strategy trees 158a-158c are generated. Each of the strategy trees 158a-158c may be generated by a machine learning model/process configured to generate a tree structure. For example, in some embodiments, at least one decision tree model 156 is configured to generate the strategy trees 158a-158c based on the training data 152. Each of the generated strategy trees 158a-158c represents a potential rule set configured to detect a malicious or undesired behavior identified within the input data 152. The plurality of strategy trees 158a-158c may be generated by running an identical algorithm (e.g., decision tree algorithm 156) on the same and/or different portions of the input data 152. Each iteration of the algorithm may generate a different strategy tree 158a-158c corresponding to different rule sets for identifying malicious behaviors. In some embodiments, two or more strategy trees 158a-158c may be generated using two or more different tree-generation processes and/or algorithms. For example, although embodiments are discussed herein including the use of a decision tree algorithm, it will be appreciated that any suitable algorithm, such as, for example, random forest models, gradient boosting models, etc., may be used.

Figure 5:
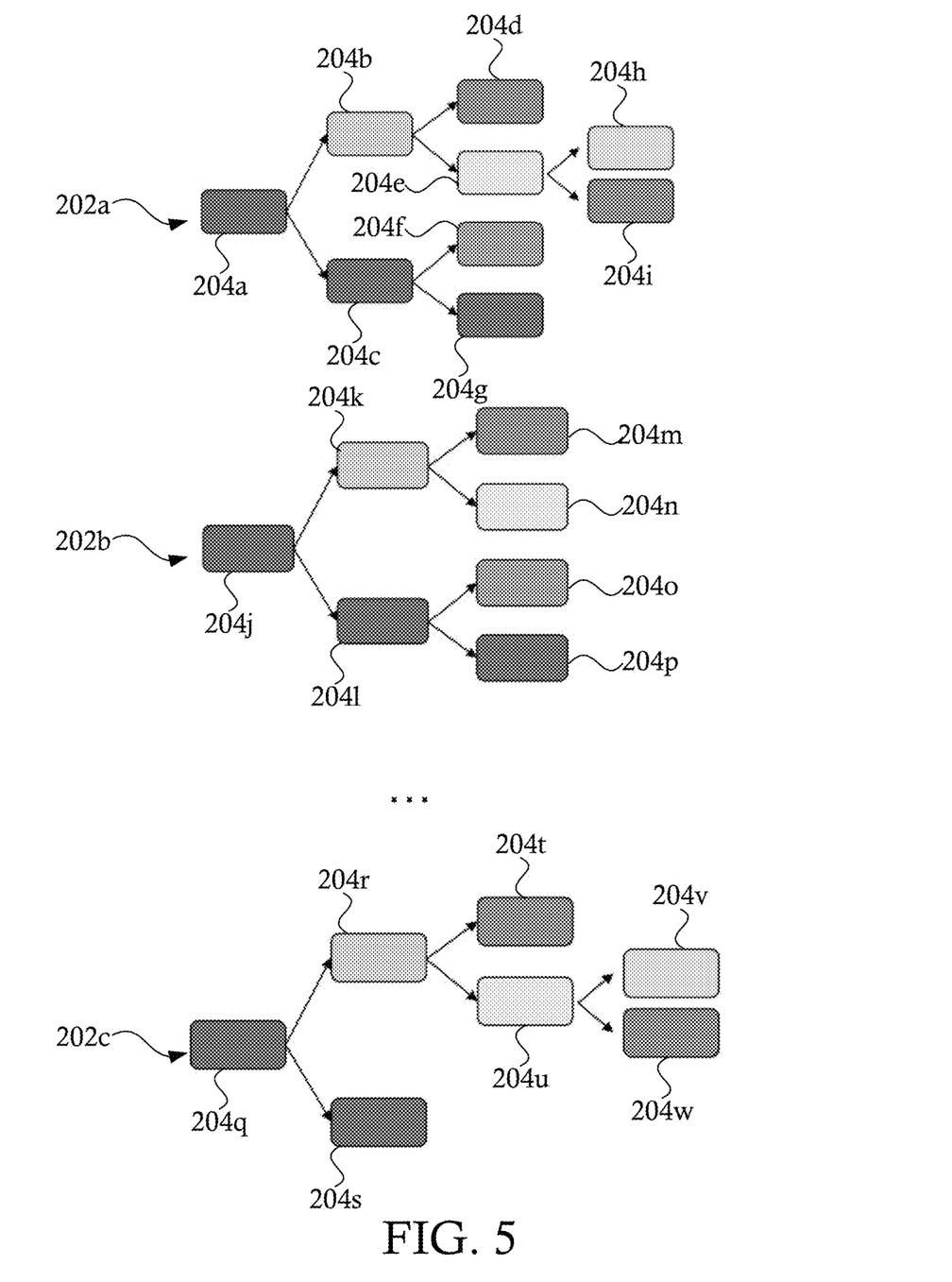
FIG. 5 illustrates a plurality of strategy trees generated according to one or more processes and configured to be evaluated by an area-under-the-curve determination, in accordance with some embodiments.

As shown in FIG. 5, in some embodiments, a set of K strategy trees (or rule sets) 202a-202c may be generated by at least one decision tree model, such as decision tree model 158 in FIG. 4. The set of K strategy trees 202a-202c include various nodes (e.g., rules or determinations) 204a-204w. As shown in FIG. 5, each of the strategy trees 202a-202c may include similar nodes 204a-204w positioned at similar locations within the tree structure, different nodes 204a-204w at similar locations, and/or similar nodes 204a-204w at different locations within the tree structure 202a-202c. Although specific embodiments are discussed herein, it will be appreciated that any number (K) of strategy trees may be generated at step 104.

Each path from a starting node to an end node (e.g., in strategy tree 202a each path going from node 204a to each of nodes 204d, 204f, 204g, 204h, 204i) represents a rule-based strategy for identifying the selected malicious behavior and/or attack vector, as discussed in greater detail below with respect to FIG. 6. For example, malicious actors attempting to exploit a system, such as an e-commerce system, may have similar attributes and/or actions, which are represented within the input data 152. Multiple combinations of similar and/or disparate attributes or actions may be capable of identifying bad actors and/or malicious actions to varying degrees. Each set of rules that may be applied to identify bad actors and/or malicious actions is represented as a path through the tree structure, e.g., a rule-based strategy. As discussed below, the rule-based strategies may be individually evaluated to identify optimal or best-case rule-based strategies for implementation.

With reference back to FIGS. 3-4, at step 106, each of the generated strategy trees 158a-158c are evaluated to select one or more "best" trees based on one or more metrics. For example, the generated strategy trees 158a-158c may be evaluated based on a PRS score and/or an AUC score. In some embodiments, an AUC score is calculated for each strategy tree 158a-158c and the strategy trees 158a-158c are ranked from highest to lowest AUC score. In some embodiments, an AUC score is calculated as an area-under-the-curve for a true positive rate (TPR) of a strategy tree 158a-158c plotted against a false positive rate (FPR) of the strategy tree 158a-158c. The AUC score may be calculated by plotting the TPR vs. FPR curve and determining the area-under-the-curve graphically and/or integrally. For example, in some embodiments, the TPR vs. FPR curve provides a plot of TPR vs. FPR for each node in the strategy tree 158a-158c and the area-under-the-curve is an integral of those values.

In some embodiments, a selected strategy tree 162 having the highest AUC score is selected for further evaluation and/or implementation in a production environment. Although embodiments are discussed herein including a single selected strategy tree 162, it will be appreciated that two or more of the strategy trees 158a-158c may be selected for further evaluation. In some embodiments, a threshold value for the AUC score may be selected and each strategy tree 158a-158c having an AUC score above the threshold value may be selected for further evaluation and/or deployment in a production environment.

At step 108, one or more rule-based strategies 166a-166c are extracted from the selected strategy tree 162. In some embodiments, the rule-based strategies 166a-166c include the "best" strategies from the selected strategy tree as determined by one or more metrics. In some embodiments, a selected strategy tree 162 is evaluated by ranking each of the final nodes (e.g., nodes 204d, 204f, 204g, 204h, 204i of tree 202a in FIG. 5) by a comprehensive evaluation score, such as a PRS score. A PRS score provides a comprehensive evaluation of each rule-based strategy within the selected strategy tree 162 by providing a single metric combining precision, recall, and stability of a rule-based strategy.

In some embodiments, a PRS score is determined as:

$$PRS = \frac{3}{\frac{1}{\alpha * \text{Precision}} + \frac{1}{\beta * \text{Recall}} + \frac{1}{\gamma * \text{stability}}}$$

where Precision, Recall, and Stability or separately calculated statistics and each of $\alpha$, $\beta$, and $\gamma$ are independent weighting constants. In various embodiments, the values of one or more weighting constants may be varied to provide emphasis on one or more of Precision, Recall, or Stability. For example, where Precision of identification (e.g., prevention of false positives) is important, the value of a may be increased to emphasize the Precision component of the PRS score. Similarly, the other weighting constants may be increased and/or decreased to emphasize and/or deemphasize each of the components of the PRS score.

In some embodiments, Precision represents the ratio of true positive identifications (i.e., the number of interactions/sets of data identified correctly as malicious/normal) to the total number of positive identifications (i.e., the total number of interactions/sets of data identified correctly as malicious/normal), e.g., the "bad" identification rate. For example, in some embodiments, Precision is determined as:

$$\text{Precision} = \frac{TP}{TP + FP}$$

where TP is the number of true positive identifications by the rule-based strategy and FP is the number of false positive identifications by the rule-based strategy.

In some embodiments, Recall represents the ratio of true positive identifications to the total number of malicious interactions represented in the data set, e.g., the "catch rate" of the rule-based strategy. For example, in some embodiments, Recall is determined as:

$$\frac{TP}{TP + FN}$$

where TP is the number of true positive identifications by the rule-based strategy and FN is the number of false negative identifications by the rule-based strategy.

In some embodiments, Stability is representative of the robustness of the rule-based strategy. Stability may be based on a combination of Precision and Recall and/or based on one or more additional or alternative features. For example, in some embodiments, the determination of Stability is based on variations in both Precision and Recall over time, although it will be appreciated that other suitable Robustness measurements may be used.

In some embodiments, one or more rule-based strategies 166a-166c are selected from the selected strategy tree 162 based on a ranking of each of the rule-based strategies by PRS score. For example, as illustrated in FIG. 6, a selected strategy tree 202a may include a plurality of rule-based strategies (e.g., tree-traversal paths) that begin at node 204a and each of which ends at one of nodes 204*d*, 204*f*, 204*g*, 204*h*, and 204*i*. Each of the rule-based strategies represents a potential rule-based strategy that may be implemented to detect malicious behavior. Each node 204*a*-204*i* in a rule-based strategy includes a node (or leaf) PRS score and a comprehensive PRS score for the rule-based strategy may be calculated by determining the PRS score for the termination node of the rule-based strategy, e.g., the PRS score for any one of the terminal nodes 204*d*, 204*f*, 204*g*, 204*h*, and 204*i*. Each of the rule-based strategies may be ranked by the comprehensive PRS score and the rule-based strategy or strategies having the highest PRS score may be selected for implementation.

Figure 6:
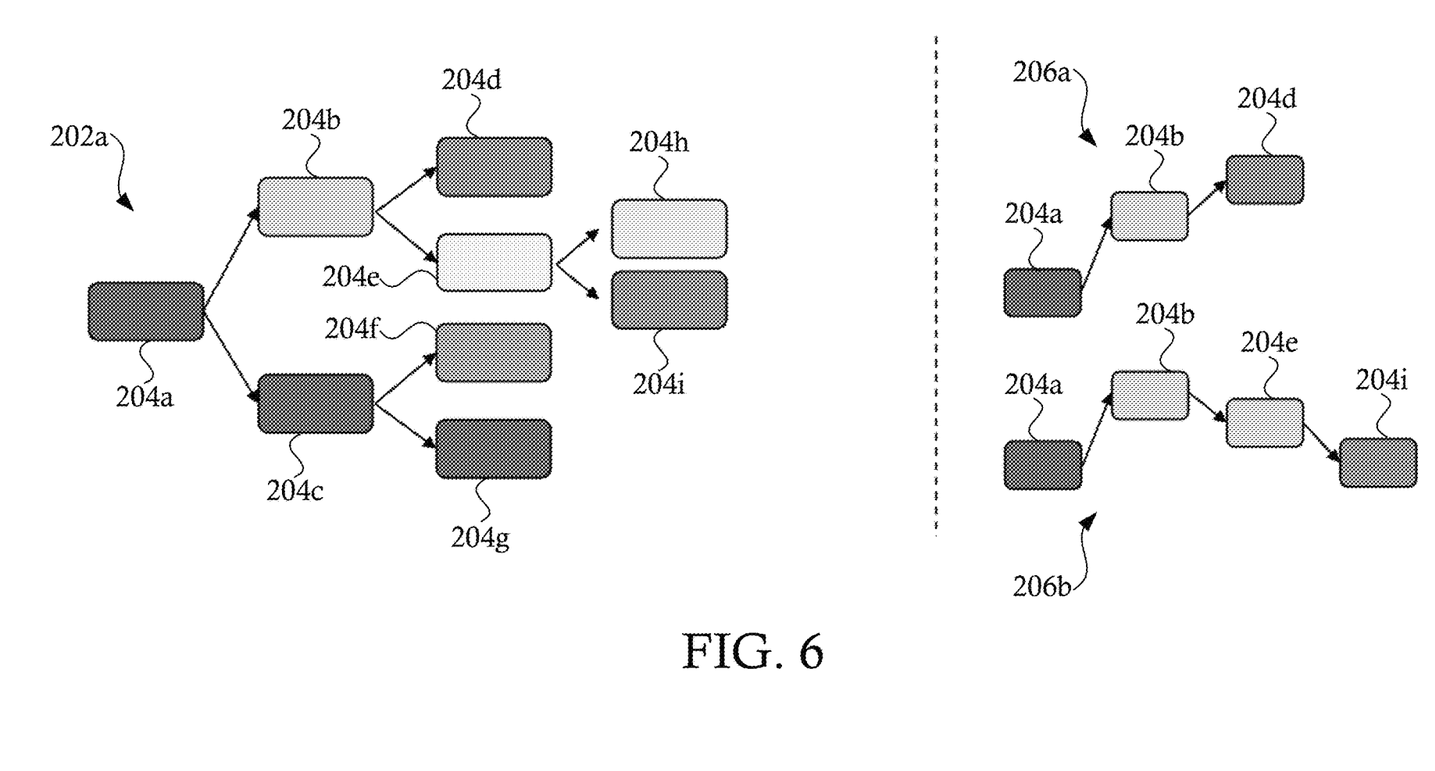
FIG. 6 illustrates a strategy tree having a plurality of rule-based strategies configured to be evaluated by a precision-recall-stability score, in accordance with some embodiments.

For example, in the embodiment illustrated in FIG. 6, a first rule-based strategy encompassing the first node 204*a*, the second node 204*b*, and the fourth node 204*d* may have a comprehensive PRS score of 0.85, a second rule-based strategy encompassing the first node 204*a*, the second node 204*b*, the fifth node 204*e*, and the eighth node 204*h* may have a comprehensive PRS score of 0.28, a third rule-based strategy encompassing the first node 204*a*, the second node 204*b*, the fifth node 204*e*, and the ninth node 204*i* may have a comprehensive PRS score of 0.66, a fourth rule-based strategy encompassing the first node 204*a*, the third node 204*c*, and the sixth node 204*f* may have a comprehensive PRS score of 0.16, and a fifth rule-based strategy encompassing the first node 204*a*, the third node 204*c*, and the seventh node 204*f* may have a comprehensive PRS score of 0.09. When ranking the rule-based strategies by PRS score, the first rule-based strategy (i.e., the path from the first node 204*a* to the fourth node 204*d*) will be ranked and selected first, as it has the highest PRS score. An extracted rule-based strategy 206a including the first rule-based strategy is shown in FIG. 6. If more than one rule-based strategy is to be extracted, the third rule-based strategy (i.e., the path from the first node 204*a* to the ninth node 204*i*) will be selected next, as it has the next highest PRS score. An extracted rule-based strategy 206b including the second rule-based strategy is also shown in FIG. 6. This selection process will continue until the number of rule-based strategies required is selected. Although specific embodiments are discussed herein, it will be appreciated that any number of rule-based strategies may be selected for implementation.

With reference again to FIGS. 3-4, at step 110, the selected rule-based strategies 166*a*-166*c* are provided for rule-based engine implementation 168. In some embodiments, the selected rule-based strategies 166*a*-166*c* are output as a strategy tree 162 including the selected rule-based strategies 166*a*-166*c* and/or may be output as the extracted rule-based strategies 166*a*-166*c* without the remainder of the strategy tree 162. In some embodiments, one or more metrics, such as Precision, Recall, and/or Stability of the selected strategy tree 162 and/or the extracted rule-based strategies 166*a*-166*c* are included as part of the output.

The extracted rule-based strategies 166*a*-166*c* may be converted into an implementable form, such as, for example, a real-time decision engine language that can be implemented by a rule-based system, such as the rule-based analysis system 26. The rule-based strategies 166*a*-166*c* may be converted by a system, such as the rule-based analysis system 26, into the implementable language upon receipt. In other embodiments, the rule-based strategies 166*a*-166*c* may be separately converted into a decision engine language prior to being provided to the rule-based analysis system 26.

At optional step 112, a new training data set may be generated, at least in part, by applying the rule-based strategies extracted and implemented at step 110. For example, in some embodiments, the use of the rule-based strategies 166*a*-166*c* may generate a new set of data that includes approved and denied transactions based on the implemented rules. As new attacks and/or malicious behaviors are identified, the data set may be modified to flag missed and/or incorrectly categorized transactions that were missed (or incorrectly classified) by the implemented rule-based strategies 166*a*-166*c*. The modified training data set may be used to generate new strategy trees for the selection of new rule-based strategies by implementing steps 104-110 using the new training data set. It will be appreciated that the selection and deployment of rule-based strategies 166*a*-166*c* may be an ongoing, iterative process in which the rule-based strategies 166*a*-166*c* from a prior iteration contribute to the data set used to train a subsequent iteration of the method 100.

Figure 7:
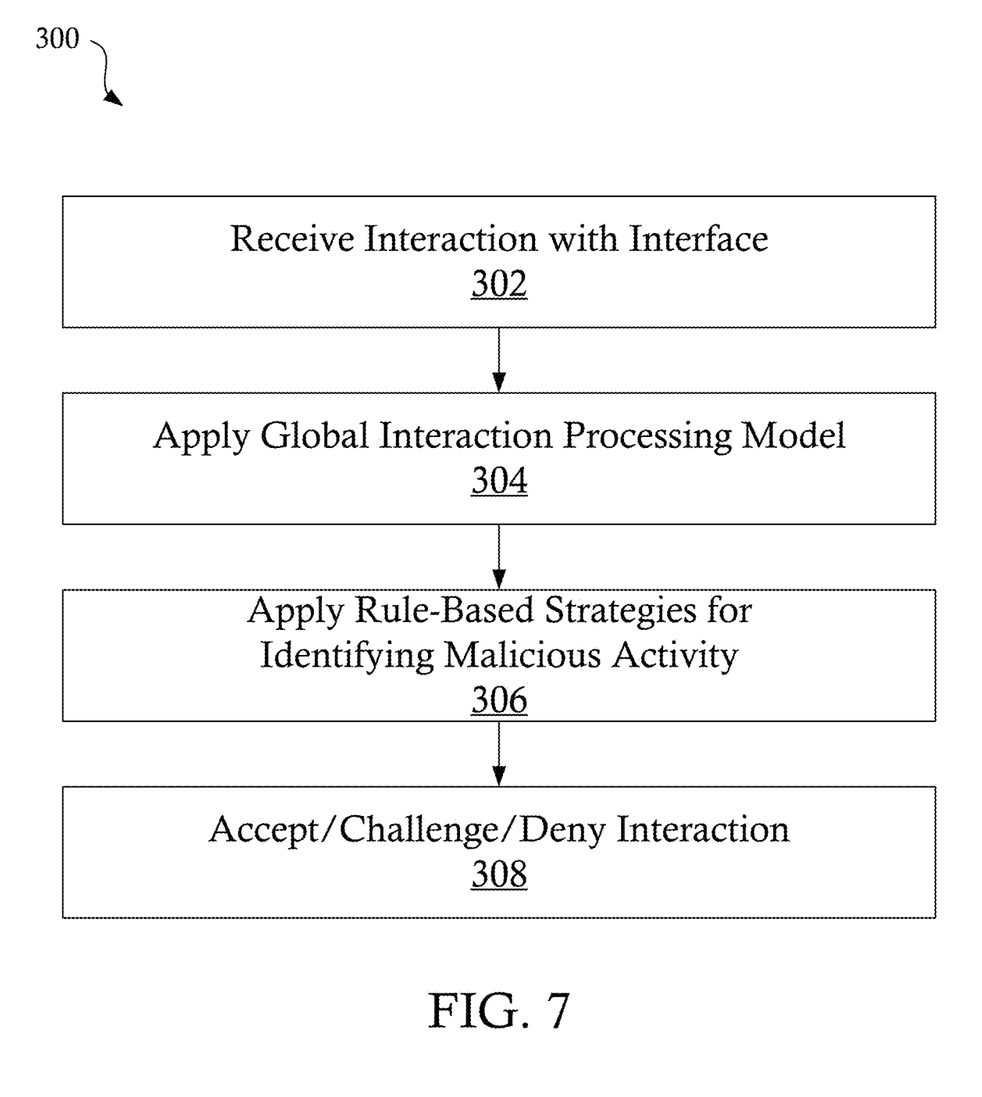
FIG. 7 is a flowchart illustrating a method of providing a network interface including rule-based strategies generated according to the method illustrated in FIG. 3, in accordance with some embodiments

FIG. 7 is a flowchart illustrating a method 300 of providing a network interface including rule-based strategies generated according to the method 100, in accordance with some embodiments. At step 302, a requested interaction is received by a network interface. For example, in some embodiments, a network interface system 24 may be configured to provide an e-commerce network interface. The e-commerce network interface may be configured to facilitate one or more interactions with a user of a user system, such as, for example, an order request, a return request, etc. At least some of the interactions provided by the network interface, such as the order request or the return request, may be susceptible to exploitation by malicious actors.

At step 304, a global interaction processing model, or framework, is applied to process the requested interaction. The global interaction processing model may include standard steps that are undertaken for processing a specific type of request. For example, in the context of an e-commerce environment, each order request may be processed according to a predetermined model that performs identical or similar steps for processing of each order request.

At step 306, one or more rule-based strategies are applied to the requested interaction. For example, in some embodiments, a rule-based analysis system 26 is configured to implement one or more rule-based strategies implemented in a real-time decision engine language. The rule-based strategies are generated by a strategy selection system 28 according to the method 100 previously discussed and may be stored in a database 30 and/or otherwise provided to the rule-based analysis system 26 for implementation. The rule-based analysis system applies each of the rule-based strategies, for example rule-based strategies 166*a*-166*c* discussed in conjunction with FIGS. 3-4, to identify malicious behavior with respect to the requested interaction.

In some embodiments, a requested interaction may be classified as an approved interaction, a denied interaction, and/or a questionable interaction. At step 308, the interaction is processed in one or more ways according to the classification of the interaction by the rule-based strategies at step 306. If the interaction is identified as an "approved" interaction, the global model for processing the interaction is allowed to complete and the interaction, is completed. For example, in the context of an e-commerce environment, a requested order is processed and fulfilled if the requested order is approved. If the interaction is identified as a "denied" interaction, the global model for processing the interaction is stopped and the interaction is not processed.

An alert, such as a fraud alert, may be generated to notify one or more additional systems regarding the stopped transaction.

In some embodiments, if the interaction is classified as a "questionable" or "suspicious" interaction, but is not outright denied, the global model for processing the interaction may be replaced with one or more focused models configured to determine if the interaction is legitimate or malicious. For example, in the context of an e-commerce environment, additional customer verification and/or alternative payment options may be requested in order to verify the legitimacy of a requested transaction. Although specific embodiments are discussed herein, it will be appreciated that the rule-based strategies generated according to method 100 may be deployed in any suitable environment and directed to any suitable malicious or undesirable behavior.

Although the subject matter has been described in terms of exemplary embodiments, the claims should be construed broadly, to include other variants and embodiments, which may be made by those skilled in the art.

What is claimed is:

1. A system, comprising:
   a non-transitory memory having instructions stored thereon and a processor configured to read the instructions to:
   receive an input data set representing a plurality of interactions that may be classified as malicious or non-malicious;
   generate at least one strategy tree including a plurality of rule-based strategies, wherein the at least one strategy tree comprises a strategy tree having a highest area-under-the-curve metric among a plurality of strategy trees for a true positive verse false positive curve and trees is generated by a machine learning model configured to generate a tree structure;
   rank the rule-based strategies based on a precision-recall-stability (PRS) score generated for each of the rule-based strategies, wherein the PRS score is a single metric combining Precision, Recall and Stability of each rule-based strategy;
   extract at least a first rule-based strategy having a highest PRS score; and
   evaluate one or more interactions using the first rule-based strategy to determine when the one or more interactions are malicious.

2. The system of claim 1, wherein the PRS score is determined according to:

$$PRS = \frac{3}{\frac{1}{\alpha * \text{Precision}} + \frac{1}{\beta * \text{Recall}} + \frac{1}{\gamma * \text{Stability}}}$$

where each of α, β, and γ are independent weighting constants.

3. The system of claim 2, wherein Precision is a ratio of true positive identifications to a total number of positive identifications of a selected rule-based strategy.

4. The system of claim 2, wherein Recall is a ratio of true positive identifications to a total number of malicious interactions in an input data set.

5. The system of claim 2, wherein Stability is determined based on variations in Precision and Recall over time.

6. The system of claim 1, wherein the first rule-based strategy is implemented in a real-time decision engine language.

7. A non-transitory computer readable medium having instructions stored thereon, wherein the instructions, when executed by a processor cause a device to perform operations comprising:
   receiving an input data set representing a plurality of interactions that may be classified as malicious or non-malicious;
   generating at least one strategy tree including a plurality of rule-based strategies, wherein the at least one strategy tree comprises a strategy tree having a highest area-under-the-curve metric among a plurality of strategy trees for a true positive verse false positive curve and is generated by a machine learning model configured to generate a tree structure;
   ranking the rule-based strategies based on a precision-recall-stability (PRS) score generated for each of the rule-based strategies, wherein the PRS score is a single metric combining Precision, Recall and Stability of each rule-based strategy;
   extracting at least a first rule-based strategy having a highest PRS score; and
   evaluating one or more interactions using the first rule-based strategy to determine when the one or more interactions are malicious.

8. The non-transitory computer readable medium of claim 7, wherein the PRS score is determined according to:

$$PRS = \frac{3}{\frac{1}{\alpha * \text{Precision}} + \frac{1}{\beta * \text{Recall}} + \frac{1}{\gamma * \text{Stability}}}$$

where each of α, β, and γ are independent weighting constants.

9. The non-transitory computer readable medium of claim 8, wherein Precision is a ratio of true positive identifications to a total number of positive identifications of a selected rule-based strategy.

10. The non-transitory computer readable medium of claim 8, wherein Recall is a ratio of true positive identifications to a total number of malicious interactions in an input data set.

11. The non-transitory computer readable medium of claim 8, wherein Stability is determined based on variations in Precision and Recall over time.

12. The non-transitory computer readable medium of claim 7, wherein the first rule-based strategy is implemented in a real-time decision engine language.

13. A method, comprising:
   receiving an input data set representing a plurality of interactions that may be classified as malicious or non-malicious;
   generating at least one strategy tree including a plurality of rule-based strategies, wherein the at least one strategy tree comprises a strategy tree having a highest area-under-the-curve metric among a plurality of strategy trees for a true positive verse fake positive curve and is generated by a machine learning model configured to generate a tree structure;
   ranking the rule-based strategies based on a precision-recall-stability (PRS) score generated for each of the rule-based strategies, wherein the PRS score is a single metric combining Precision, Recall and Stability of each rule-based strategy;

extracting at least a first rule-based strategy having a highest PRS score; and evaluating one or more interactions using the first rule-based strategy to determine when the one or more interactions are malicious.

14. The method of claim 13, wherein the PRS score is determined according to:

$$PRS = \frac{3}{\frac{1}{\alpha * \text{Precision}} + \frac{1}{\beta * \text{Recall}} + \frac{1}{\gamma * \text{Stability}}}$$

where each of $\alpha$, $\beta$, and $\gamma$ are independent weighting constants.

15. The method of claim 14, wherein Precision is a ratio of true positive identifications to a total number of positive identifications of a selected rule-based strategy, Recall is a ratio of true positive identifications to a total number of malicious interactions in an input data set, and Stability is determined based on variations in Precision and Recall over time.

* * * * *

UNITED STATES PATENT AND TRADEMARK OFFICE
CERTIFICATE OF CORRECTION

PATENT NO. : 12,182,255 B2
APPLICATION NO. : 17/589773
DATED : December 31, 2024
INVENTOR(S) : Siyuan Zhou et al.

Page 1 of 1

It is certified that error appears in the above-identified patent and that said Letters Patent is hereby corrected as shown below:

In the Claims

Claim 1, Column 13, Line 36, after "and" delete "trees".

Claim 13, Colum 14, Line 63, delete "fake" and insert --false--.

Signed and Sealed this
Fourth Day of March, 2025

Coke Morgan Stewart
*Acting Director of the United States Patent and Trademark Office*